United States Patent
Spitzer et al.

(10) Patent No.: US 6,814,873 B2
(45) Date of Patent: Nov. 9, 2004

(54) METHOD OF PREVENTING OR REDUCING ALUMINOSILICATE SCALE IN A BAYER PROCESS

(75) Inventors: Donald P. Spitzer, Stamford, CT (US); Alan S. Rothenberg, Wilton, CT (US); Howard I. Heitner, Stamford, CT (US); Frank Kula, Danbury, CT (US)

(73) Assignee: Cytec Technology Corp., Wilmington, DE (US)

( * ) Notice: Subject to any disclaimer, the term of this patent is extended or adjusted under 35 U.S.C. 154(b) by 106 days.

(21) Appl. No.: 10/201,209

(22) Filed: Jul. 22, 2002

(65) Prior Publication Data

US 2004/0011744 A1 Jan. 22, 2004

(51) Int. Cl.⁷ .................................................. C02F 5/10
(52) U.S. Cl. ...................... 210/698; 210/701; 252/180; 423/121
(58) Field of Search ................................ 210/698–701; 252/180, 181; 423/121, 122, 130

(56) References Cited

U.S. PATENT DOCUMENTS

| 3,682,831 A | * | 8/1972 | Tate ............................. 252/180 |
| 4,010,110 A | * | 3/1977 | Cosentino et al. .......... 252/180 |
| 4,344,860 A | * | 8/1982 | Plueddemann .......... 252/389.32 |
| 4,564,456 A | * | 1/1986 | Homan ........................ 210/698 |
| 5,080,801 A | * | 1/1992 | Molter et al. ................ 210/699 |
| 5,314,626 A | | 5/1994 | Dimas .......................... 201/698 |
| 5,415,782 A | | 5/1995 | Dimas .......................... 210/698 |
| 5,733,459 A | | 3/1998 | Rothenberg et al. ........ 210/698 |
| 6,086,771 A | | 7/2000 | Selvarajan et al. .......... 210/701 |

FOREIGN PATENT DOCUMENTS

JP        11-090488        4/1999

OTHER PUBLICATIONS

V.G. Kazakov et al., "Heating Evaporation of Silicon–Containing Aluminate Solutions," Translated from Tsvetnye Metally, pp. 45–48, 1979.
S.M. Monhot, "Silicate Copolymers for Silica Scale Inhibition," PPG Industries, Chemical Technical Center, pp. 19–26, 1995.

* cited by examiner

Primary Examiner—Peter A. Hruskoci
(74) Attorney, Agent, or Firm—Fran S. Wasserman

(57) ABSTRACT

Materials and a process are provided whereby polymers with the pendant group or end group containing —Si(OR")$_3$ (where R" is H, an alkyl group, Na, K, or NH$_4$) are used to control aluminosilicate scaling in a Bayer process. When materials of the present invention are added to the Bayer liquor before the heat exchangers, they reduce and even completely prevent formation of aluminosilicate scale on heat exchanger walls. The present materials are effective at treatment concentrations that make them economically practical.

18 Claims, No Drawings

METHOD OF PREVENTING OR REDUCING ALUMINOSILICATE SCALE IN A BAYER PROCESS

BACKGROUND OF THE INVENTION

The Bayer process is almost universally used to manufacture alumina. In this process raw bauxite ore is first heated with caustic soda solution at temperatures in the range of 140 to 250° C. This results in the dissolution (digestion) of most of the aluminum-bearing minerals, especially the alumina trihydrate gibbsite and alumina monohydrate boehmite, to give a supersaturated solution of sodium aluminate (pregnant liquor). Resulting concentrations of dissolved materials are very high, with sodium hydroxide concentrations being greater than 150 grams/liter and dissolved alumina being greater than 120 g/l. Any undissolved solids are then physically separated from the aluminate solution, and a polymeric flocculant is used to speed the removal of the fine solid particles. Residual suspended solids are removed by a filtration step. The filtered clear solution or liquor is cooled and seeded with alumina trihydrate to precipitate a portion of the dissolved alumina. After alumina precipitation, this depleted or spent liquor is reheated and reused to dissolve-more fresh bauxite.

Bauxite ores used in the Bayer process also contain silica in various forms and amounts, depending on the source of the bauxite. The caustic used to dissolve the aluminum minerals also dissolves part or all of the silica content of the bauxite, especially the silica that is present in the form of aluminosilicate clays. The silica rapidly dissolves in the digestion step to form solutions that are supersaturated with respect to silica. This dissolved silicate reacts relatively slowly with the sodium aluminate in solution to form complex hydrated sodium aluminum silicates, generally designated "desilication products." The principal desilication product is the species known as sodalite: $3(Na_2O.Al_2O_3.2SiO_2.2H_2O)Na_2X$, where X can be $CO_3^{-2}$, $2Cl^-$, $SO_4^{-2}$, or $2AlO_2^-$. Other related species such as cancrinite and noselite are also possible, so the more general term sodium aluminosilicate is preferred. All of these desilication products are of low solubility in the sodium aluminate liquor and largely precipitate out of solution, thereby removing undesirable silica from the solution.

The rate at which the desilication products precipitate out, however, is slow and even when a lengthy "predesilication" step is used, concentrations of dissolved silica remain well above equilibrium values. Some of this silica subsequently precipitates with the precipitated alumina and contaminates the alumina. Even after the alumina precipitation step, silica concentrations are still above equilibrium values in the so-called "spent liquor", and because of the reduced aluminum concentrations, the silica becomes easier to precipitate out, in the form of sodalite and related minerals. An essential part of the Bayer process is to reheat this spent liquor so that it can be used to digest more bauxite ore. In the heat exchangers used to reheat the liquor, the higher temperatures increase the rate of aluminosilicate precipitation and as a result, aluminosilicate deposits as "scale" on the inside walls of the heat exchangers. The scale has low thermal conductivity compared to the steel of the walls and heat transfer is severely reduced as scale builds up. This reduced heat transfer caused by aluminosilicate scaling is sufficiently severe that the heat exchange units have to be taken out of service and cleaned frequently, as often as every one to two weeks.

Scaling that is related to silica can be minimized to some extent by a combination of blending bauxite ores with different silica contents, by optimizing the time and temperature of the digestion step, and by use of a separate desilication step. The situation is however complicated by the fact that silica in the solution or liquor is not necessarily proportional to the silica in the starting bauxite. Since the Bayer process is continuous, or cyclical, silica would continually increase if it were not removed from the system as aluminosilicate. Some silica is necessary to increase supersaturation to initiate precipitation of desilication products. Bayer liquors are always supersaturated with respect to silica and this excess silica can readily precipitate as aluminosilicate, especially onto the inside surfaces of heat exchangers.

There is considerable economic impact of aluminosilicate scale on alumina production. Cleaning of the heat exchangers with acid is itself a high maintenance cost. The acid cleaning also reduces the life of the heat exchangers, therefore adding cost due to frequent replacement of the heat exchangers. Moreover, the reduced heat exchanger efficiency caused by scaling leads to higher demand and cost for energy in the form of steam. The scaled pipes also result in decreased flow of liquor and potentially lost production. Altogether the costs directly due to scaling constitute a significant portion of the cost of producing alumina.

Scale build up has also been known to be a problem in boiler water systems and a number of treatments for reducing scale in boiler water systems have been proposed. In boiler water systems, pH is generally only 8 to 9 and dissolved salts are usually not present in concentrations more than about one to five grams/liter. Exemplary treatments for scale in boilers include siliconate polymers such as the copolymers of acrylic acid, 2-acrylamido-2-methylpropane sulfonic acid (AMPS), and 3-(trimethoxysilyl)propyl-methacrylate as disclosed by Mohnot (*Journal of PPG Technology*, 1 (1), (1995) 19–26). These polymers were reported to reduce the amount of silica gel adhering to the wall of polytetrafluoroethylene bottles in tests done with 645 ppm $SiO_2$ at pH 8.3 and 100° C., i.e., conditions approximating those in a boiler. A Japanese patent application (Kurita Water Ind. Ltd., 11-090488 (1999)) also deals with adhesion of silica-type scale in cooling water or boiler water systems. The compositions disclosed are vinyl silanol/vinyl alcohol copolymers, which may also contain, e.g., allyl alcohol or styrene. Tests were done in water that contained 200 mg/l silica at pH 9.0 and temperatures of 45–75° C. Use of the subject compounds reportedly led to less silica scale compared to an acrylic acid-AMPS copolymer.

In boilers the pH is generally quite mild, only 8 to 9 and dissolved salts are usually not present in concentrations more than about one to five grams/liter. Additionally, scales formed in boiler water systems consist of primarily amorphous silica, although other scales such as calcium carbonate, calcium phosphate, etc., are possible. In contrast, the supersaturated solutions at high temperatures and high pH of essentially 14, make scaling problems much more serious and difficult to contend with in plants that carry out the Bayer process than in boilers. In addition, the concentrations of dissolved salts (i.e., sodium aluminate, sodium carbonate, sodium hydroxide, etc.) in the Bayer process are very high, such that total dissolved salt concentrations are greater than 200 grams/liter. It is not surprising, therefore, that the scales that form in the Bayer process are distinctly different from those that form in boilers and unlike boiler scales, all Bayer scales contain aluminum, which is expected because of the high concentrations of aluminum in the Bayer solutions or liquors. In particular, the aluminosilicate scales contain equal numbers of aluminum and silicon atoms.

Thus, although there have been treatments available for boiler scales, there has been limited success in obtaining methods and/or chemical additives that reduce or eliminate aluminosilicate scaling in the Bayer processing of alumina. The earliest attempts appear to be the use of a siloxane polymer (a silicon-oxygen polymer with ethyl and —ONa groups attached to the silicons), i.e.,

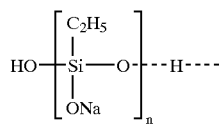

that reportedly reduced scaling during the heating of aluminate solutions (V. G. Kazakov, N. G. Potapov, and A. E. Bobrov, *Tsvetnye Metally* (1979) 43–44; V. G. Kazakov, N. G. Potapov, and A. E. Bobrov, *Tsvetnye Metally* (1979) 45–48). It was reported that at the relatively high concentrations of 50–100 mg/l, this polymer was effective in preventing decrease of the heat transfer coefficient of heat exchanger walls. Methods of altering the morphology of aluminosilicate scales have been disclosed using either amines and related materials (U.S. Pat. No. 5,314,626 (1994)) or polyamines or acrylate-amide polymers (U.S. Pat. No. 5,415,782 (1995)). While these materials were shown to modify the morphology of the aluminosilicate particles, there were no examples of reduction in the amount of scaling. Additionally, treatment concentrations required were quite high, in the range of 50 to 10,000 parts per million.

Hence, thus far no economically practical materials or process has been offered to solve the problem of aluminosilicate scaling in the Bayer process industry. There is, in fact, currently no way at all to eliminate aluminosilicate scaling in the Bayer process. Because of the severe problems caused by aluminosilicate scaling, it would be a great benefit to the industry to have a cost-effective treatment method that would reduce these problems and expenses.

SUMMARY OF THE INVENTION

The present invention solves the aforementioned problems and others by providing materials and a process whereby polymers with the pendant group or end group containing —Si(OR)$_3$ (where R is H, an alkyl group, Na, K, or NH$_4$) are used to reduce or eliminate aluminosilicate scaling in a Bayer process. When materials of the present invention are added to the Bayer liquor before the heat exchangers, they reduce and even completely prevent formation of aluminosilicate scale on heat exchanger walls. Moreover, the present materials are effective at treatment concentrations that make them economically practical.

DETAILED DESCRIPTION OF THE INVENTION

The present invention is directed to a process and materials for the reduction of aluminosilicate containing scale in the Bayer process. The process comprises the step of adding to a Bayer process stream an aluminosilicate containing scale inhibiting amount of a polymer having pendant thereto a group or end group containing —Si(OR")$_3$ where R"=H, C1–C3 alkyl, aryl, Na, K or NH$_4$. The present inventors have found that the scale reducing or inhibiting properties of the polymer having a pendant group containing—Si(OR")$_3$ where R"=H, C1–C3 alkyl, aryl, Na, K or NH$_4$, attached thereto is not dependant on the configuration and/or size of the polymer to which the group is attached. Therefore, any polymer, having the requisite group containing —Si(OR")$_3$ where R"=H, C1–C3 alkyl, aryl, Na, K or NH$_4$ attached thereto should therefore be suitable for use in the present invention.

In a preferred embodiment, the group containing—Si(OR")$_3$, where R"=H, C1–C3 alkyl, aryl, Na, K or NH$_4$ comprises a group according to —G—R—X—R'—Si(OR")$_3$ where G=no group, NH, NR" or O; R=no group, C=O, O, C1–C10 alkyl, or aryl; X=no group, NR, O, NH, amide, urethane, or urea; R'=no group, O, C1–C10 alkyl, or aryl; and R"=H, C1–C3 alkyl, aryl, Na, K or NH$_4$. In one embodiment, the group is —NH—R—X—R'—Si(OR")$_3$, where R=no group, O, C1–C10 alkyl, or aryl; X=O, NH, an amide, urethane, or urea; R'=no group, O, C1–C10 alkyl, or aryl; and R"=H, C1–C3 alkyl, aryl, Na, K or NH$_4$. In another embodiment the polymer includes, but is not limited to, a polymer according to the formula:

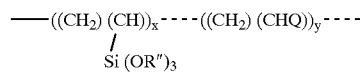

where x=0.1–100%, y=99.9–0%; and Q=H, C1–C10 alkyl, or aryl, COXR where R=H, C1–C10 alkyl, aryl, X=O or NH; and (Q can be of more than one type); and R"=H, C1–C10 alkyl, aryl, Na, K or NH$_4$. In another preferred embodiment a polymer according to the formula:

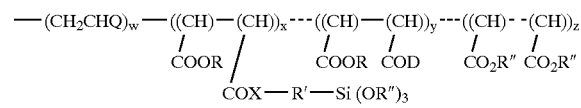

where w=1–99.9%, x=0.1–50%, y=0–50%, z=0–50%; and Q=C1–C10 alkyl, aryl, amide, acrylate, ether, COXR where X=O or NH and R=H, Na, K, NH$_4$, C1–C1 alkyl or aryl, or any other substituent; X=NH, NR" or O; R'=C1–10 alkyl, or aryl; R"=H, C1–C3 alkyl, aryl, Na, K or NH$_4$; and D=NR"$_2$ or OR", with the proviso that all R and R" groups do not have to be the same is used, wherein a polymer according to the formula:

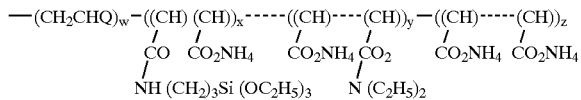

where w=1–99.9%, x=0.1–50%, y=0–50%, z=0–50%; and Q is phenyl is a specific example.

In another preferred embodiment a polymer according to the formula:

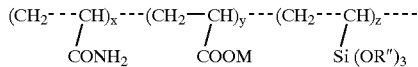

where x=1–99%, y=1–99%, z=0.5–20% and M=Na, K, $NH_4$; and R"=H, C1–10 alkyl, aryl, Na, K or $NH_4$ is used; wherein a polymer according to formula:

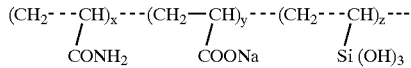

where x=1–99%, y=1–99%, z=0.5–20% is a specific example.

The polymer to which the group is pendant can comprise at least one nitrogen to which the pendant group is attached. Exemplary polymers comprising at least one nitrogen to which the pendant group is attached include, but are not limited to, a polymer according to the following formula:

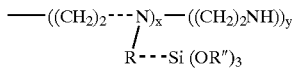

where x=0.1–100%, y=99.9–0%; and R=no group, C1–C10 alkyl, aryl, or —COX—R'—, where X=O or NH and R'=no group, C1–C10 alkyl or aryl; and R"=H, C1–C3 alkyl, aryl, Na, K or $NH_4$; wherein a polymer according to the formula:

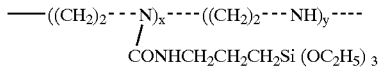

where x=0.5–20%, y=99.5–80% and a polymer according to the formula:

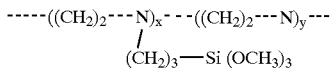

where x=0.5–20%, y=99.5–80% are preferred.

In another embodiment the polymer having a —Si(OR")$_3$ containing pendant group attached thereto is grafted to another polymer. Exemplary such polymers include, but are not limited to, polymers of the formulae:

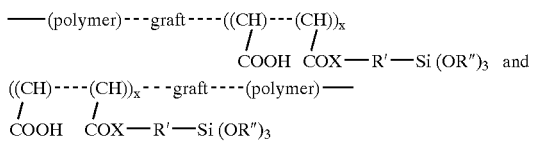

where x=0.1–99% (as percentage of monomer units in the polymer) and X=NH, NR' or O; R'=C1–C10 alkyl, or aryl and R"=H, C1–C3 alkyl, aryl, Na, K or $NH_4$, wherein

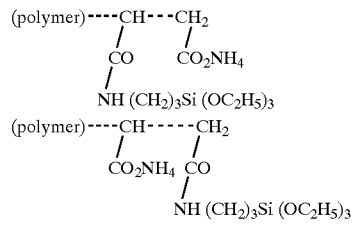

is a specific example.

The polymers used in the invention can be made in a variety of ways. For example, they can be made by polymerizing a monomer containing the group —Si(OR")$_3$, where R"=H, C1–C3 alkyl, aryl, Na, K or $NH_4$, such as for example a silane monomer, or copolymerizing such a monomer with one or more co-monomers. Suitable silane monomers for use in the present invention include, but are not limited to vinyltriethoxysilane, vinyltrimethoxysilane, allyltriethoxysilane, butenyltriethoxysilane, gama-N-acrylamidopropyltriethoxysilane, p-triethoxysilylstyrene, 2-(methyltrimethoxysilyl) acrylic acid, 2-(methyltrimethoxysilyl)-1,4 butadiene, N-triethoxysilylpropyl-maleimide and other reaction products of maleic anhydride and other unsaturated anhydrides with amino compounds containing the —Si(OR")$_3$ group. These monomers can be hydrolyzed by aqueous base, either before or after polymerization. Suitable co-monomers for use in the present invention include, but are not limited to, vinyl acetate, acrylonitrile, styrene, acrylic acid and its esters, acrylamide and substituted acrylamides such as acrylamidomethylpropanesulfonic acid. The copolymers can also be graft copolymers such as polyacrylic acid-g-poly (vinyltriethoxysilane) and poly(vinyl acetate-co-crotonic acid)-g-poly(vinyltriethoxysilane). These polymers can be made in a variety of solvents. Solvents suitable for such use include, but are not limited to, acetone, tetrahydrofuran, toluene, xylene, etc. In some cases the polymer is soluble in the reaction solvent and is recovered by stripping off the solvent. Alternatively, if the polymer is not soluble in the reaction solvent, the product is recovered by filtration. Suitable initiators for use in the present invention include, but are not limited to, 2,2'azobis(2,4-dimethylvaleronitrile) and 2,2-azobisisobutyronitrile, benzoyl peroxide, and cumene hydroperoxide.

In another embodiment of the present invention, polymers useful in the invention can be made by reacting a compound containing a —Si(OR")$_3$ group as well as a reactive group that reacts with either a pendant group or backbone atom of an existing polymer. For example, polyamines can be reacted with a variety of compounds containing —Si(OR")$_3$ groups to give polymers which can be used for the invention. Suitable reactive groups include, but are not limited to an alkyl halide group, such as for example, chloropropyl, bromoethyl, chloromethyl, and bromoundecyl. The compound containing —Si(OR")$_3$, can contain an epoxy functionality such as glycidoxypropyl, 1,2-epoxyamyl, 1,2-epoxydecyl or 3,4-epoxycyclohexylethyl. The reactive group can also be a combination of a hydroxyl group and a halide, such as 3-chloro-2-hydroxypropyl. The reactive moiety can also contain an isocyanate group, such as isocyanatopropyl, or isocyanatomethyl that react to form a urea linkage. In addition, silanes containing anhydride groups, such as triethoxysilylpropylsuccinic anhydride are suitable for use in making the polymers for the present invention. The reactions can be carried out either neat or in a suitable solvent. In addition, other functional groups such as alkyl groups can be added by reacting other amino groups or nitrogen atoms on the polymer with alkyl halides, epoxides or isocyanates. The polyamines can be made by a variety of methods. They can be made by a ring opening polymerization of aziridine or similar compounds. They also can be made by condensation reactions of amines such as ammonia, methylamine, dimethylamine, ethylenediamine etc. with reactive compounds such as 1,2-dichloroethane, epichlorohydrin, epibromohydrin and similar compounds.

Polymers containing anhydride groups can be reacted with a variety of compounds containing —Si(OR")$_3$ to make polymers suitable for use in the present invention. Suitable anhydride containing polymers include, but are not limited to, maleic anhydride homopolymer, and copolymers of maleic anhydride with monomers such as styrene, ethylene and methylvinylether. The polymer can also be a graft copolymer such as poly(1,4-butadiene)-g-maleic anhydride or polyethylene-g-maleic anhydride and the like. Other suitable anhydride monomers include, but are not limited to, itaconic and citraconic anhydrides. Suitable reactive silane compounds include, but are not limited to γ-aminopropyltriethoxysilane, bis(gama-triethoxysilylpropyl)amine, N-phenyl-gama aminopropyltriethoxysilane, p-aminophenyltriethoxysilane, 3-(m-aminophenoxypropyl)-trimethoxysilane, and gama-aminobutyltriethoxylsilane. Other functional groups can be added to the polymer by reacting it with amines, alcohols and other compounds. In a preferred polymer for use in the present invention, maleic anhydride is the anhydride and the co-monomer is styrene. A preferred silane is gama-aminopropyltriethoxysilane. It is also advantageous to react some of the anhydride groups with another amine such as diethylamine.

The same type of amino compound containing an —Si(OR")$_3$ group can be reacted with polymers containing a pendant isocyanate group, such as copolymers of for example, isopropenyldimethylbenzylisocyanate and vinyl isocyanate, with co-monomers including, but not limited to, vinyl acetate, styrene, acrylic acid, and acrylamide. These polymers can also be reacted with other compounds such as amines to enhance performance.

Isocyanate functional compounds with an —Si(OR")$_3$ group such as gama-isocyanatopropyltrimethoxysilane can also be reacted with polymers containing hydroxyl groups such as hydrolyzed poly(vinyl acetate) and copolymers of vinyl acetate with other monomers. Other hydroxyl containing polymers suitable for use include, but are not limited to, polysaccharides and polymers containing N-methylolacrylamide.

In the present process, the amount of polymer added to the process stream can depend on the composition of the Bayer liquor involved and generally all that is required is an aluminosilicate containing scale inhibiting amount thereof. In general the polymer is preferably added to the process stream in economically and practically favorable concentrations. A preferred concentration is one that is greater than about 0 ppm to about 300 ppm, more preferably in a concentration that is greater than about 0 ppm to about 50 ppm and most preferably the polymer is added to the process stream in a concentration that is greater than about 0 ppm to about 10 ppm.

The polymer can be added directly to the apparatus in which the formation of aluminosilicate containing scale is to be inhibited. It is preferred, however to add the polymer to a charge stream or recycle stream or liquor leading to the particular apparatus. While the polymer can be added to the Bayer process stream at any time during the process, it is preferable to add it at any convenient point in the Bayer process before or during application of heat. Usually, the polymer is added immediately before the heat exchangers. The polymer could also be added, e.g., to the liquor before alumina precipitation or any other point between the precipitators and the heat exchangers.

EXAMPLES

Test Procedure

A synthetic Bayer liquor is made by adding 12 ml of a sodium silicate solution (27.7 g/l of a sodium silicate solution that is 28.9% SiO$_2$) to 108 ml of a sodium aluminate solution that contains sodium aluminate, excess sodium hydroxide, and sodium carbonate. After mixing, the solution contains 0.8 g/l SiO$_2$, 45 g/l Al$_2$O$_3$, 150 g/l NaOH, and 40 g/l Na$_2$CO$_3$. If a scale reducing additive is used, it is added just before the silicate is added to the aluminate solution (generally the additive is used as a solution containing 1–10% of active reagent). This solution is put into a polyethylene bottle along with a strip of pre-weighed clean mild steel (25 mm×95 mm) and the sealed bottle is heated with agitation at 100° C. for 18±2 hours. Eight to twelve such tests (bottles) are done at one time. At the end of the 18 hours, the bottles are opened, the steel strip is thoroughly rinsed and dried, and the solution is filtered (0.45μ filter). Considerable aluminosilicate scale is observed to form on both the steel surface and as loose aluminosilicate in the liquor (which may have initially formed on the polyethylene surfaces). The weight gain of the steel is a measure of the amount of aluminosilicate scaling (with no additive, the weight gain on the steel is typically about 30 mg). In the examples below, the weight of scale formed on the steel strip is expressed as a percentage of the average weight of scale that formed on two blanks (i.e, no additive used) that were part of the same set of tests. Similarly, the total amount of aluminosilicate precipitated is also a measure of antiscalant activity and this may be expressed as a percentage of the total aluminosilicate that formed in the two blank experiments that were part of the same set of tests (with no additive, the total aluminosilicate precipitated is typically about 150 mg).

Comparative Example A

A commercial sample of potassium methyl siliconate, similar to the polymer described by Kazakov, et al., is diluted to 5% polymer in 2% NaOH. It is used in accordance with the Test Procedure described above with the following results reported in Table A.

TABLE A

| Dosage, mg/l | Scale on steel, % vs. blank* | Total sodalite formed, % vs. blank* |
|---|---|---|
| 300 | 97 | 84 |
| 1000 | 30 | 57 |

*no additive

It was observed that operating at this very treatment concentration is not practical for a commercial operation.

Example 1

A polymer with the structure

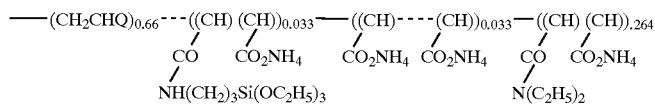

(Q is phenyl)

is made as follows: 42 g of a styrene-maleic anhydride (SMA) copolymer, with a mole ratio of styrene to maleic anhydride of 2.0, is dissolved in 87 g of acetone. A separate solution is made with 3.03 g of gama-aminopropyltriethoxysilane, 8.02 g of diethylamine and 21 g of acetone. The amine solution is then added to the polymer solution and allowed to react for 15 minutes at ambient temperature. One hundred eighty milliliters (180 ml) of deionized (D.I.) water is mixed with 20 ml of 28% aqueous ammonia and heated to 70° C. The aqueous ammonia is then added to the polymer solution and the mixture heated to 65° C. to evaporate the acetone. The result is a solution containing 23.4% polymer based on the total weight of SMA polymer and the two amines. It is tested in accordance with the Test Procedure described above with the following results reported in Table B.

TABLE B

| Dosage, mg/l | Scale on steel, % vs. blank* | Total sodalite formed, % vs. blank* |
|---|---|---|
| 300 | 0 | 0 |
| 50 | 0 | 0 |
| 10 | 0 | 0 |

*no additive

Example 2

A 25.0 g aliquot of the polymer solution from Example 1 is added to 200 ml of isopropanol to precipitate the polymer, which is washed with isopropanol and dried. The dried polymer contains 0.80% silicon. A 2% solution of the isolated polymer is made in a mixture of NaOH and aqueous ammonia. It is tested in accordance with the Test Procedure with the results reported in Table C.

TABLE C

| Dosage, mg/l | Scale on steel, % vs. blank* | Total sodalite formed, % vs. blank* |
|---|---|---|
| 300 | 0 | 0 |
| 50 | 0 | 0.2 |
| 10 | 0 | 0.1 |

*no additive

Comparative Example B

A polymer with the structure

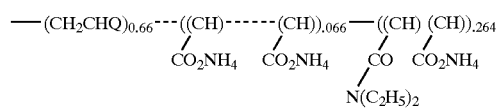

(Q is phenyl)

is made by reacting the same SMA polymer used in Example 1 with diethylamine in acetone and then adding warm aqueous ammonia to give an aqueous solution containing 23.4% polymer, which is diluted to 2% polymer with 2% aqueous NaOH. This is tested in accordance with the Test Procedure with the results reported in Table D.

TABLE D

| Dosage, mg/l | Scale on steel, % vs. blank* | Total sodalite formed, % vs. blank* |
|---|---|---|
| 300 | 137 | 103 |
| 50 | 183 | 97 |
| 10 | 125 | 97 |

*no additive

Example 3

An amine polymer with the structure

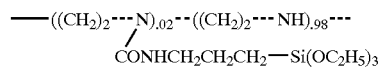

is made as follows: 2.3 g of gama-isocyanatopropyltriethoxysilane is mixed with 20 g of a polyethyleneimine. After 30 min. at ambient temperature, 1.0 g of the mixture is diluted to 20.0 g with 2% NaOH. This polymer solution is tested in accordance with the Test Procedure as previously described. Results are reported in Table E.

TABLE E

| Dose | Scale on steel, % vs. blank* | Total sodalite formed, % vs. blank* |
|---|---|---|
| 300 | 88 | 29 |
| 50 | 183 | 65 |
| 10 | 172 | 94 |

*no additive

Example 4

A polymer containing the pendant groups $$(\text{polymer})\text{----CH---CH}_2$$
$$\phantom{xxxxxxxx}|\phantom{xxx}|$$
$$\phantom{xxxxxxx}\text{CO}\phantom{xx}\text{CO}_2\text{NH}_4$$
$$\phantom{xxxxxx}|$$
$$\phantom{xxxxxx}\text{NH(CH}_2)_3\text{Si(OC}_2\text{H}_5)_3$$

$$(\text{polymer})\text{----CH-----CH}_2$$
$$\phantom{xxxxxxxxx}|\phantom{xxxx}|$$
$$\phantom{xxxxxx}\text{CO}_2\text{NH}_4\phantom{x}\text{CO}$$
$$\phantom{xxxxxxxxxxxx}|$$
$$\phantom{xxxxxxxxxxxx}\text{NH(CH}_2)_3\text{Si(OC}_2\text{H}_5)_3$$

is made from a commercial copolymer of maleic anhydride grafted onto polybutadiene. (The anhydride equivalent weight is given as 490.)

Twenty grams (20 g) of the polymer is dissolved in 80 g of acetone. 0.90 g of aminopropyltriethoxysilane is mixed with 10 g of acetone. The amine solution is then added to the polymer solution and allowed to react for 15 minutes at ambient temperature. 100 ml of D.I. water is mixed with 10 ml of 28% aqueous ammonia and heated to 70° C. The aqueous ammonia is then added to the polymer solution and the mixture heated to 65° C. to evaporate the acetone. The resulting aqueous solution contains 15.1% polymer. The solution is diluted to 5% polymer in 2% NaOH and tested in accordance with the Test procedure with the following results reported in Table F.

TABLE F

| Dosage, mg/l | Scale on steel, % vs. blank* | Total sodalite formed, % vs. blank* |
|---|---|---|
| 300 | 1.1 | 7.6 |
| 100 | 10.0 | 19.9 |

*no additive

Example 5

Eighteen (18.00) grams of polyethyleneimine is mixed with 2.00 grams of chloropropyltrimethoxysilane and the mixture is heated at 100° C. for 16 hours to give the product shown below.

$$\text{-----((CH}_2)_2\text{NH)}_{0.97}\text{- -((CH}_2)_2\text{---N)}_{0.03}\text{---}$$
$$\phantom{xxxxxxxxxxxxxxxxxxxxxxxx}|$$
$$\phantom{xxxxxxxxxxxxxxxxxxxx}(\text{CH}_2)_3\text{Si(OCH}_3)_3$$

A portion of the product is dissolved in water containing 20 g/l NaOH and this solution is used in accordance with the Test Procedure described above and the results are reported in Table G.

TABLE G

| Dosage, mg/l | Scale on steel, % vs. blank* | Total sodalite formed, % vs. blank* |
|---|---|---|
| 200 | 0 | 0 |
| 100 | 0 | 0 |
| 50 | 4 | 1 |

*no additive

Example 6

5.56 g of 50% NaOH is added to a solution consisting of 16.00 g acrylamide and 41.2 g water. 4.00 g vinyltriethoxysilane is then added. 0.2 g of azobis-isobutyronitrile in 6 ml ethanol is added and the mixture is heated at 70° C. The resulting polymer is found to contain silicon as expected from the structure below, following hydrolysis in NaOH solution, which also converts a majority of the amide functionality to carboxyl groups:

$$\text{-----(CH2---CH)}_{0.215}\text{---(CH2---CH)}_{0.70}\text{---(CH2---CH)}_{0.085}\text{---}$$
$$\phantom{xxxxxxxx}|\phantom{xxxxxxxxxxxxx}|\phantom{xxxxxxxxxxxxx}|$$
$$\phantom{xxxxxxx}\text{CONH}_2\phantom{xxxxxxx}\text{COONa}\phantom{xxxxxx}\text{Si(ONa)}_3$$

A solution of this polymer is tested in accordance with the Test Procedure and the results are reported in Table H.

TABLE H

| Dosage, mg/l | Scale on steel, % vs. blank* | Total sodalite formed, % vs. blank* |
|---|---|---|
| 300 | 4 | 23 |
| 100 | 6 | 5 |

*no additive

Changes can be made in the composition, operation and arrangement of the process of the present invention described herein without departing from the concept and scope of the invention as defined in the following claims.

What is claimed is:

1. A process for the reduction of sodium aluminosilicate containing scale in a Bayer process comprising the step of:

adding to a Bayer process stream an aluminosilicate containing scale inhibiting amount of a polymer having pendant thereto a group or an end group containing Formula I:

—Si(OR")$_3$         Formula I where R"=H, C1–C10 alkyl, aryl, Na, K or NH$_4$.

2. The process for the reduction of aluminosilicate containing scale in a Bayer process according to claim 1, wherein the group comprises a group according to Formula II:

—G—R—X—R'—Si(OR")$_3$         Formula II where
G=no group, NH, NR" or O;
R=no group, C=O, O, C1–C10 alkyl, or aryl;
X=no group, NR, O, NH, amide, urethane, or urea;
R'=no group, O, C1–C10 alkyl, or aryl; and
R"=H, C1–C3 alkyl, aryl, Na, K or NH$_4$.

3. The process for the reduction of aluminosilicate containing scale in a Bayer process according to claim 2, in which the polymer is a polymer according to Formula IV:

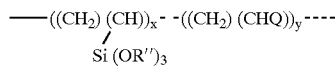

Formula IV where
x=0.1–100%, y=99.9–0%; and
Q=H, C1–C10 alkyl, or aryl, COXR where R=H, C1–C10 alkyl, aryl, X=O or NH;
and (Q can be of more than one type); and
R''=H, C1–C3 alkyl, aryl, Na, K or $NH_4$.

4. The process for the reduction of aluminosilicate containing scale in a Bayer process according to claim 2, wherein the polymer is a polymer according to Formula V:

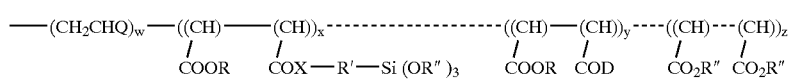

Formula V where
w=1–99.9%, x=0.1–50%, y=0–50%, z=0–50%; and
Q=C1–C10 alkyl, aryl, amide, acrylate, ether, COXR where X=O or NH and R=H, C1–C10 alkyl or aryl, or any other substituent;
R=H, Na, K, $NH_4$;
X=NH, NR''or O;
R'=C1–C10 alkyl, or aryl;
R''=H, C1–C3 alkyl, aryl, Na, K or $NH_4$; and
D=$NR''_2$ or OR'', with the proviso that all R and R'' groups do not have to be the same.

5. The process for the reduction of aluminosilicate containing scale in a Bayer process according to claim 4, wherein the polymer is a polymer according to the formula:

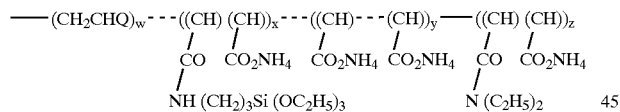

where
w=1–99.9%, x=0.1–50%, y=0–50%, z=0–50%; and
Q is phenyl.

6. The process for the reduction of aluminosilicate containing scale in a Bayer process according to claim 2, wherein the polymer is a polymer according to Formula VI:

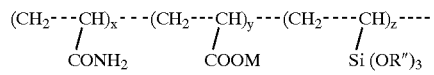

Formula VI where:
x=1–99%, y=1–99%, z=0.5–20% and
M=Na, K, $NH_4$; and
R''=H, C1–C3 alkyl, aryl, Na, K or $NH_4$.

7. The process for the reduction of aluminosilicate containing scale in a Bayer process according to claim 6, wherein the polymer is a polymer according to the formula:

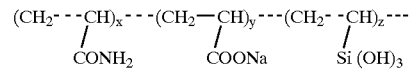

where:
x=1–99%, y=1–99%, z=0.5–20%.

8. The process for the reduction of aluminosilicate containing scale in a Bayer process according to claim 1, wherein the polymer comprises at least one nitrogen to which the group is pendant thereto.

9. The process for the reduction of aluminosilicate containing scale in a Bayer process according to claim 8, wherein the polymer comprises a polymer according to Formula III:

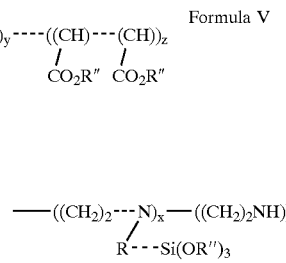

Formula III where
x=0.1–100%, y=99.9–0%; and
R=no group, C1–C10 alkyl, aryl, or —COX—R'—, where X=O or NH and R'=no group, C1–C10 alkyl or aryl; and
R''=H, C1–C3 alkyl, aryl, Na, K or $NH_4$.

10. The process for the reduction of aluminosilicate containing scale in a Bayer process according to claim 9, wherein the polymer is a polymer according to the formula:

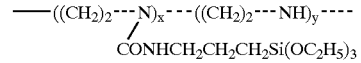

where x=0.5–20%, y=99.5–80%.

11. The process for the reduction of aluminosilicate containing scale in a Bayer process according to claim 9, wherein the polymer is a polymer according to the formula:

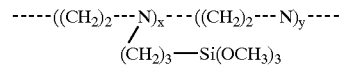

where x=0.5–20%, y=99.5–80%.

12. The process for the reduction of aluminosilicate containing scale in a Bayer process according to claim 1, wherein the polymer containing a pendant group of Formula I is grafted to another polymer.

13. The process for the reduction of aluminosilicate containing scale in a Bayer process according to claim 12, wherein the silicon-containing polymer is a graft copolymer of Formula VIIa or Formula VIIb:

Formula VIIa

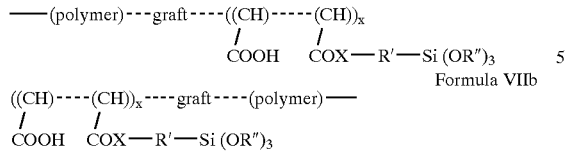

Formula VIIb

——((CH)----(CH))ₓ----graft----(polymer)——
　　　／　　　／
　　COOH　COX—R'—Si(OR")₃ where x=0.1–99% (as percentage of monomer units in the polymer) and

X=NH, NR' or O;

R'=C1–C10 alkyl, or aryl and

R"=H, C1–C3 alkyl, aryl, Na, K or NH₄.

14. The process for the reduction of aluminosilicate containing scale in a Bayer process according to claim 13, wherein the polymer is a polymer according to the formula:

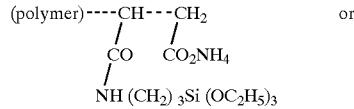 or

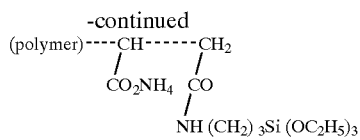

15. The process for the reduction of aluminosilicate containing scale in a Bayer process according to claim 1, wherein the polymer is added to the process stream in a concentration that is greater than about 0 ppm to about 300 ppm.

16. The process for the reduction of aluminosilicate containing scale in a Bayer process according to claim 15, wherein the polymer is added to the process stream in a concentration that is greater than about 0 ppm to about 50 ppm.

17. The process for the reduction of aluminosilicate containing scale in a Bayer process according to claim 16, wherein the polymer is added to the process stream in a concentration that is greater than about 0 ppm to about 10 ppm.

18. The process for the reduction of aluminosilicate containing scale in a Bayer process according to claim 1, wherein the polymer is added to the process stream at a point in the Bayer process before or during application of heat.

* * * * *